(12) United States Patent
Topel

(10) Patent No.: US 10,251,383 B1
(45) Date of Patent: Apr. 9, 2019

(54) FLEXIBLE FISHING HOUSE LIGHT-EMITTING DEVICE

(71) Applicant: Matthew Jacob Topel, Garfield, MN (US)

(72) Inventor: Matthew Jacob Topel, Garfield, MN (US)

( * ) Notice: Subject to any disclaimer, the term of this patent is extended or adjusted under 35 U.S.C. 154(b) by 115 days.

(21) Appl. No.: 15/391,274

(22) Filed: Dec. 27, 2016

(51) Int. Cl.
| | |
|---|---|
| *A01K 97/01* | (2006.01) |
| *F21L 4/00* | (2006.01) |
| *F21V 21/088* | (2006.01) |
| *F21V 21/14* | (2006.01) |
| *F21V 23/04* | (2006.01) |
| *F21W 131/40* | (2006.01) |

(52) U.S. Cl.
CPC ............... *A01K 97/01* (2013.01); *F21L 4/00* (2013.01); *F21V 21/0885* (2013.01); *F21V 21/145* (2013.01); *F21V 23/0414* (2013.01); *F21W 2131/40* (2013.01)

(58) Field of Classification Search
CPC . A01K 97/01; F21V 23/0414; F21V 21/0885; F21V 21/145; F21L 4/00; F21W 2131/40
See application file for complete search history.

(56) References Cited

U.S. PATENT DOCUMENTS

| | | | | |
|---|---|---|---|---|
| 4,616,437 A | * | 10/1986 | Harvey ................ | A01K 97/125 43/17 |
| 5,709,458 A | * | 1/1998 | Metz ....................... | F21V 21/32 362/96 |
| 6,149,489 A | * | 11/2000 | Johnson ................. | A47D 13/02 297/183.1 |
| 8,915,609 B1 | * | 12/2014 | Shah ........................ | F21S 4/10 362/183 |
| 2003/0210543 A1 | * | 11/2003 | Sharrah ................... | F21L 4/027 362/187 |
| 2005/0171407 A1 | * | 8/2005 | Rosenkranz ............. | F21S 9/02 600/249 |

* cited by examiner

*Primary Examiner* — Anh T Mai
*Assistant Examiner* — Glenn D Zimmerman
(74) *Attorney, Agent, or Firm* — Dave Alan Lingbeck

(57) ABSTRACT

A flexible fishing hole light-emitting device for adjustably extending and shining a light into an ice fishing hole. The flexible fishing hole light-emitting device includes a base assembly adapted to be removably attached to an object, wherein the base assembly includes a power unit; and a light-emitting assembly including a flexible elongated support member and a light-emitting member with light-emitting diode in communication with the support member and the power unit.

3 Claims, 4 Drawing Sheets

FLEXIBLE FISHING HOUSE LIGHT-EMITTING DEVICE

BACKGROUND OF THE INVENTION

Field of the Invention

The present invention relates to light-emitting devices and more particularly pertains to a new flexible fishing hole light-emitting device for adjustably extending and shining a light into an ice fishing hole.

Description of the Prior Art

The use of light-emitting devices is known in the prior art. More specifically, light-emitting devices heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a portable ice fishing house or enclosure and an electroluminescent (EL) lighting system provided inside the enclosure, wherein flexible EL lighting panels that provide EL light are attached to the wall. Another prior art includes a housing, a dirt collector, a suction generator, a wand, a hose, a light source, a light director and a light transmitter. The light source is provided on the apparatus at a first point while the light director is provided on the apparatus at a second point remote from the first point. The light transmitter extends between the first and second points. The light source, transmitter and director all function together to direct light from the light source past the wand onto a work area to be cleaned. Another prior art includes a pull-down self-supportive lighting device mounted on hand-reachable ceilings, the lighting device comprising retracting unit, illuminating unit, and gooseneck connected between units and. Retracting unit is mounted above an opening on the ceiling. Illuminating unit has a retracted position adjacent to retracting unit. Gooseneck has a predetermined internal structure and a bendability and rigidity balance that allows its winding inside retracting unit while being able to hold illuminating unit fixed in place. While these devices fulfill their respective, particular objectives and requirements, the aforementioned patents do not disclose a new flexible fishing hole light-emitting device.

SUMMARY OF THE INVENTION

The general purpose of the present invention, which will be described subsequently in greater detail, is to provide a new flexible fishing hole light-emitting device which has many of the advantages of the light-emitting devices mentioned heretofore and many novel features that result in a new flexible fishing hole light-emitting device which is not anticipated, rendered obvious, suggested, or even implied by any of the prior art light-emitting devices, either alone or in any combination thereof. The present invention includes a base assembly adapted to be removably attached to an object, wherein the base assembly includes a power unit; and a light-emitting assembly including a flexible elongated support member and a light-emitting member with light-emitting diode in communication with the support member and the power unit. None of the prior art includes the combination of the elements of the present invention.

There has thus been outlined, rather broadly, the more important features of the flexible fishing hole light-emitting device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new flexible fishing, hole light-emitting device which has many of the advantages of the light-emitting devices mentioned heretofore and many novel features that result in a new flexible fishing hole light-emitting device which is not anticipated, rendered obvious, suggested, or even implied by any of the prior art light-emitting devices, either alone or in any combination thereof.

Still another object of the present invention is to provide a new flexible fishing hole light-emitting device for adjustably extending and shining a light into an ice fishing hole.

Still yet another object of the present invention is to provide a new flexible fishing hole light-emitting device that can be clipped to a collapsible fishing house support and adjusted to shine a light into the ice fishing hole.

Even still another object of the present invention is to provide a new flexible fishing hole light-emitting device that can be easily mounted to a wall of the ice fishing house and wound any which way as needed and extended into the ice fishing hole.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
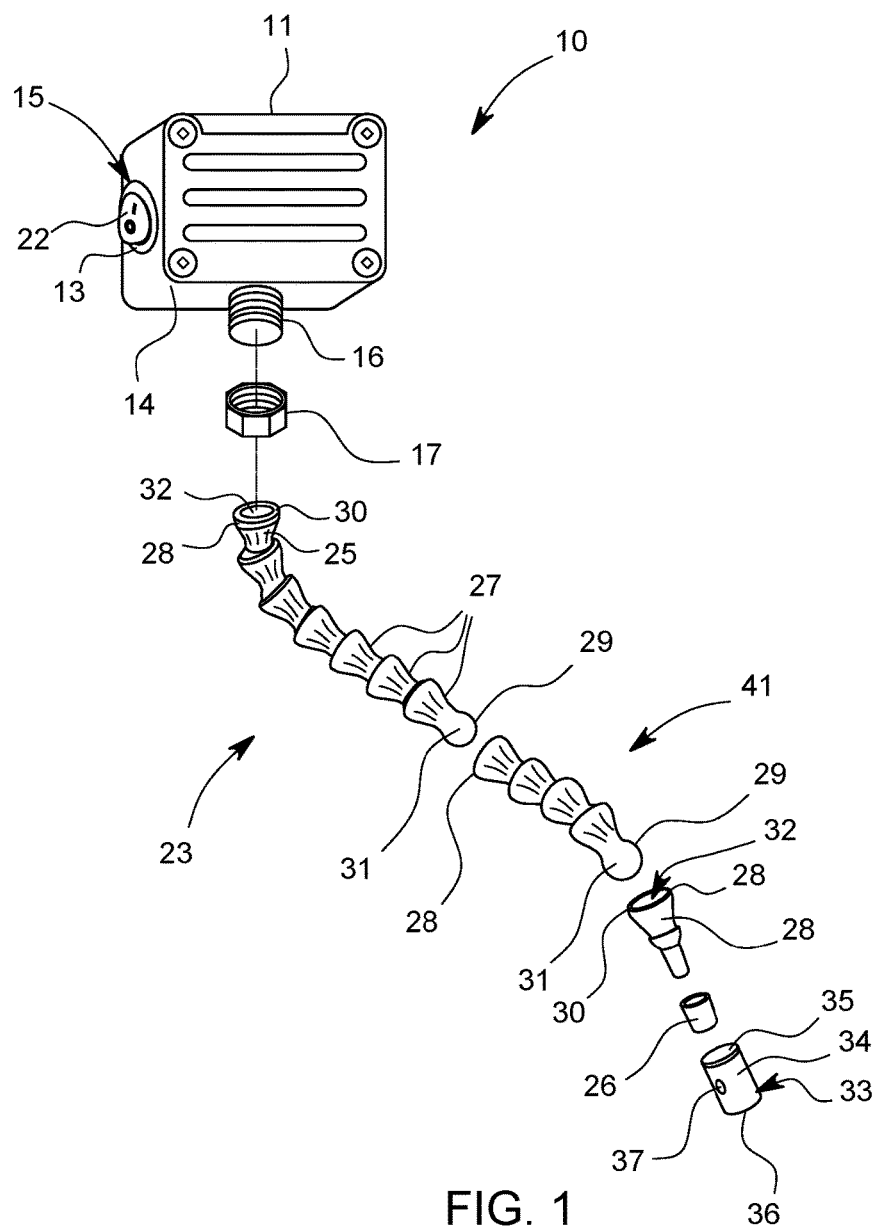
FIG. 1 is an exploded perspective view of a new flexible fishing hole light-emitting device according to the present invention.
Figure 2:
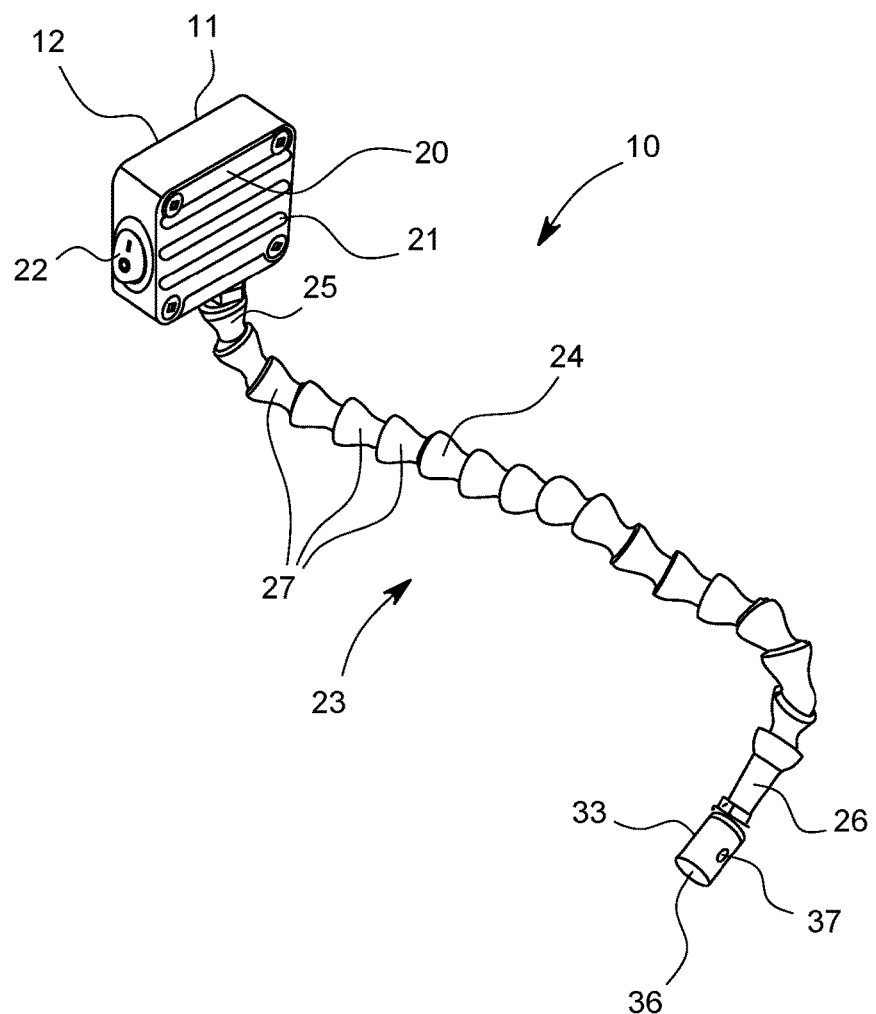
FIG. 2 is a perspective view of the present invention.

With reference now to the drawings, and in particular to FIGS. 1 through 4 thereof, a new flexible fishing hole light-emitting device embodying the principles and concepts of the present invention and generally designated by the reference numeral 10 will be described.

As best illustrated in FIGS. 1 through 4, the flexible fishing hole light-emitting device 10 generally comprises a base assembly 11 adapted to be removably attached to an object 38, 39 and includes a power unit 20; and also comprises a light-emitting assembly 23 including a flexible elongated support member 24 and a light-emitting member 33 with a light-emitting diode 37 in communication with the elongated support member 24 and the power unit 20.

As shown in FIGS. 1 through 4, the power unit 20 includes a housing 12 having walls 13, 14 with a first opening 15 disposed through one of the walls 13 into the housing 12 and a second opening 16 disposed through another one of the walls 14 in the housing 12. The power unit 20 also includes a power supply 21 conventionally disposed in the power unit 20 for energizing the light-emitting diode 37 and further includes a power switch 22 conventionally disposed in the first opening 15 upon the housing 12 and being in operable communication with the power supply 21 and the light-emitting member 33. The base assembly 11 also includes a connector 17 conventionally coupled to one of the walls 14 of the housing 12 and positioned about the second opening 16. The base assembly 11 further includes a fastener 19 conventionally coupled to the housing 12 and fastenable about a collapsible fishing house support 39 to support the housing 12 upon the collapsible fishing house support 39. The fastener 19 is a C-shaped clip 19 for clipping to the collapsible fishing house support 39.

As illustrated in FIGS. 1 through 4, the elongated support member 24 includes linkages 25-27 pivotally connected end to end to form a flexible multi-jointed protective sheath 41. Each of the linkages 25-27 has first and second ends 28, 29 with a socket 30 integrally formed at the first end 28 and a ball 31 integrally formed at the second end 29, and a bore 32 extending through each of the linkages 25-27 and through the ball 32 and the socket 30. The linkages 25-27 include a base linkage 25 pivotally and conventionally coupled to the connector 17 and positioned upon and in alignment with the second opening 16. The linkages 25-27 further include a support linkage 26 conventionally coupled to the light-emitting member 33, and intermediate linkages 27 disposed between and interconnecting the base linkage 25 and the support linkage 26 and coupled end to end. The linkages 25-27 adjacent to one another are coupled together with the ball 31 of one of the adjacent linkages 25-27 pivotally and conventionally retained in the socket 30 of another of the adjacent linkages 25-27. The light-emitting member 33 includes a case 34 having first and second open ends 35,36 with the first open end 35 conventionally coupled to the support linkage 26 with the light-emitting diode 37 conventionally disposed in the case 34 proximate to the second open end 36 and in operable communication with the power switch 22 and the power supply 21 using conventional wiring to emit a light beam from the case 34 through the second open end 36. The wiring passes through the bore 32 of each of the linkages 25-27.

Figure 3:
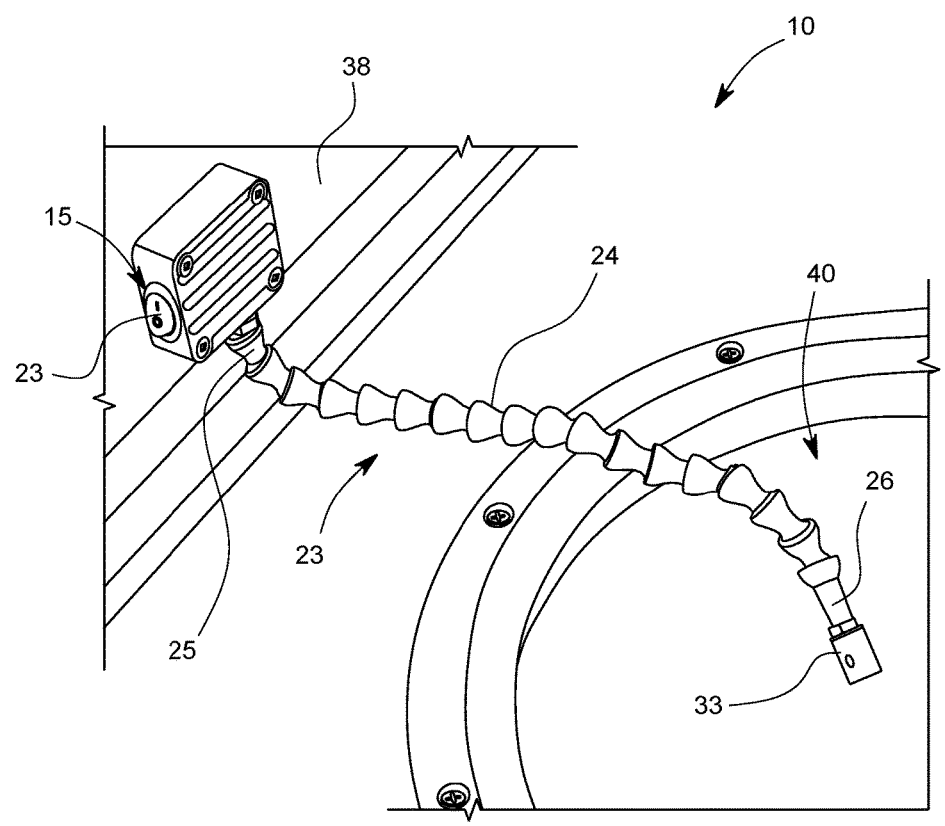
FIG. 3 is a side elevation view of the present invention attached to a wall in an ice fishing house.

As shown in FIG. 3, the housing 12 is fastenable to a wall 38 of a fishing house using conventional means with the elongated support member being 24 extendable into the fishing hole 40 with the light-emitting diode emitting 37 the light beam into the fishing hole 40.

Figure 4:
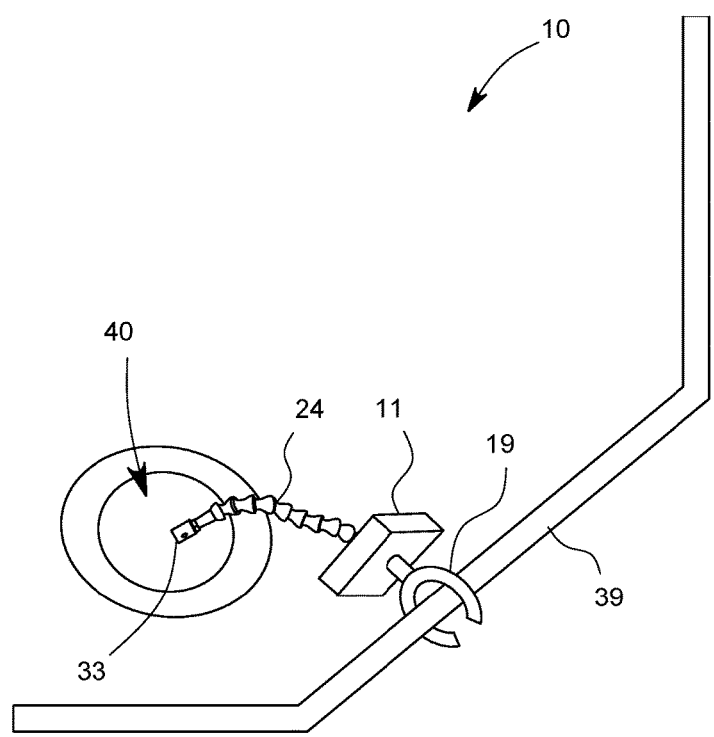
FIG. 4 is a side elevation view of the present invention clipped to a collapsible fishing house support.

As shown in FIG. 4, the housing 12 is fastenable to the collapsible fishing house support 39 using the fastener 19 with the elongated support member 24 extendable from the collapsible fishing house support 39 and into the fishing hole 40 with the light-emitting diode 37 emitting the light beam into the fishing hole 40.

In use, the user either conventionally fastens the housing 12 to the wall 38 of the fishing house near where the fishing hole 40 is located or clips the housing 12 to the collapsible fishing house support 39 and then extends the elongated support member 24 into the fishing hole 40 and energizes the light-emitting diode 37 using the power switch 22 to emit a light beam into the fishing hole 40 so that the user can see into what otherwise is a dark hole in order to see what is occurring upon the surface of the water. Once finished, the user can easily remove the housing 12 from with the wall 38 of the fishing house or from the collapsible fishing house support 39.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the flexible fishing hole light-emitting device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A flexible fishing hole light-emitting device comprising:
    a base assembly adapted to be removably attached to an object, wherein the base assembly includes a power unit, wherein the power unit includes a housing having walls with a first opening disposed through one of the walls into the housing and a second opening disposed through another one of the walls in the housing, wherein the base assembly also includes a connector coupled to one of the walls of the housing and positioned about the second opening; and
    a light-emitting assembly including a flexible elongated support member and a light-emitting member with a light-emitting diode in communication with the support member and the power unit, wherein the support member includes linkages pivotally connected end to end to form a flexible multi-jointed protective sheath, wherein each of the linkages has first and second ends with a socket disposed at the first end and a ball disposed at the second end, and a bore extending through each of the linkages and through the ball and the socket, wherein the linkages include a base linkage pivotally coupled to the connector and disposed upon and in alignment with the second opening.

2. The flexible fishing hole light-emitting device as described in claim 1, wherein the linkages further include a support linkage coupled to the light-emitting member, and intermediate linkages disposed between the base linkage and the support linkage and coupled end to end.

3. The flexible fishing hole light-emitting device as described in claim 1, wherein the light-emitting member includes a case having first and second open ends with the first open end coupled to the support linkage with the light-emitting diode disposed in the case proximate to the second open end and in operable communication with the power switch and the power supply to emit a light beam from the case through the second open end.

\* \* \* \* \*